R. A. LIGHT AND J. W. PRICE, Jr.
MACHINE FOR SAWING INTEGRALLY CAST PACKING RINGS INTO SEGMENTS.
APPLICATION FILED NOV. 27, 1920.
1,413,668.
Patented Apr. 25, 1922.
3 SHEETS—SHEET 1.
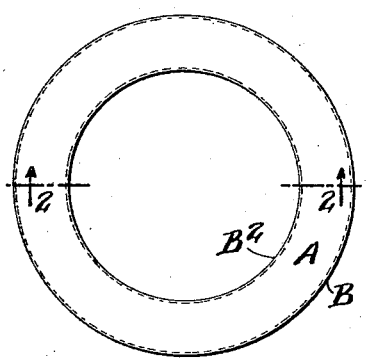
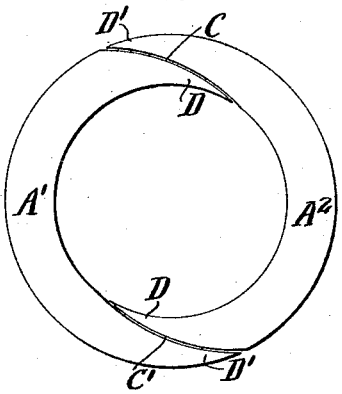
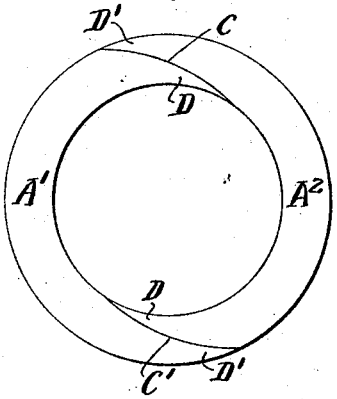
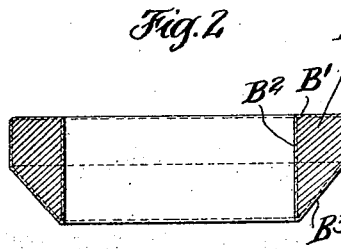
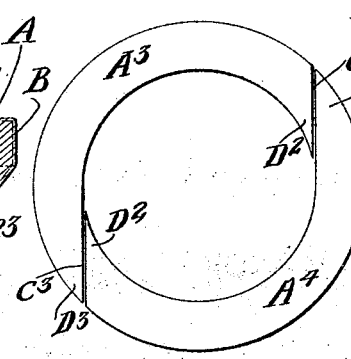
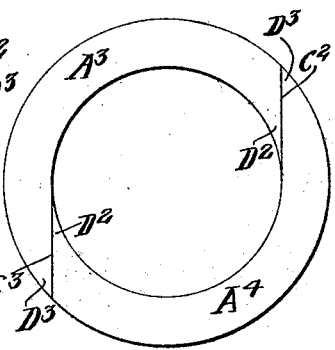
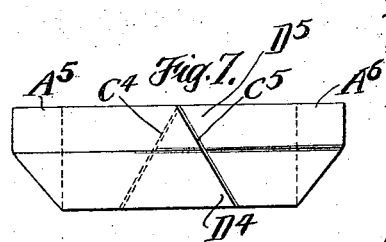
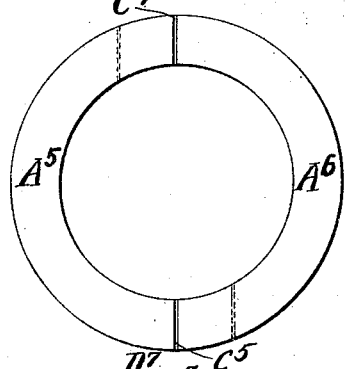
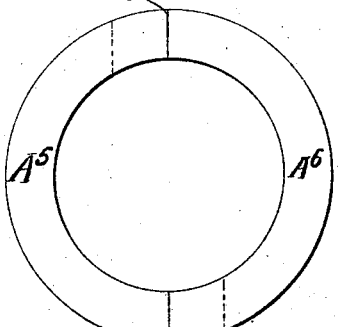
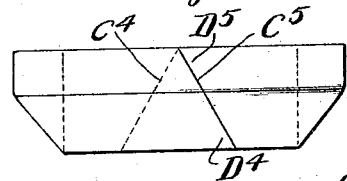
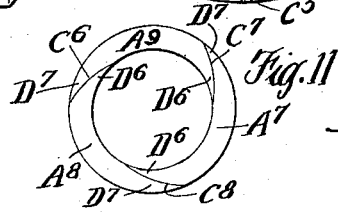
WITNESS.
Gustav Genzlinger.
INVENTORS
Ralph A. Light
Joseph W. Price Jr.
BY
Francis Chambers
ATTORNEY

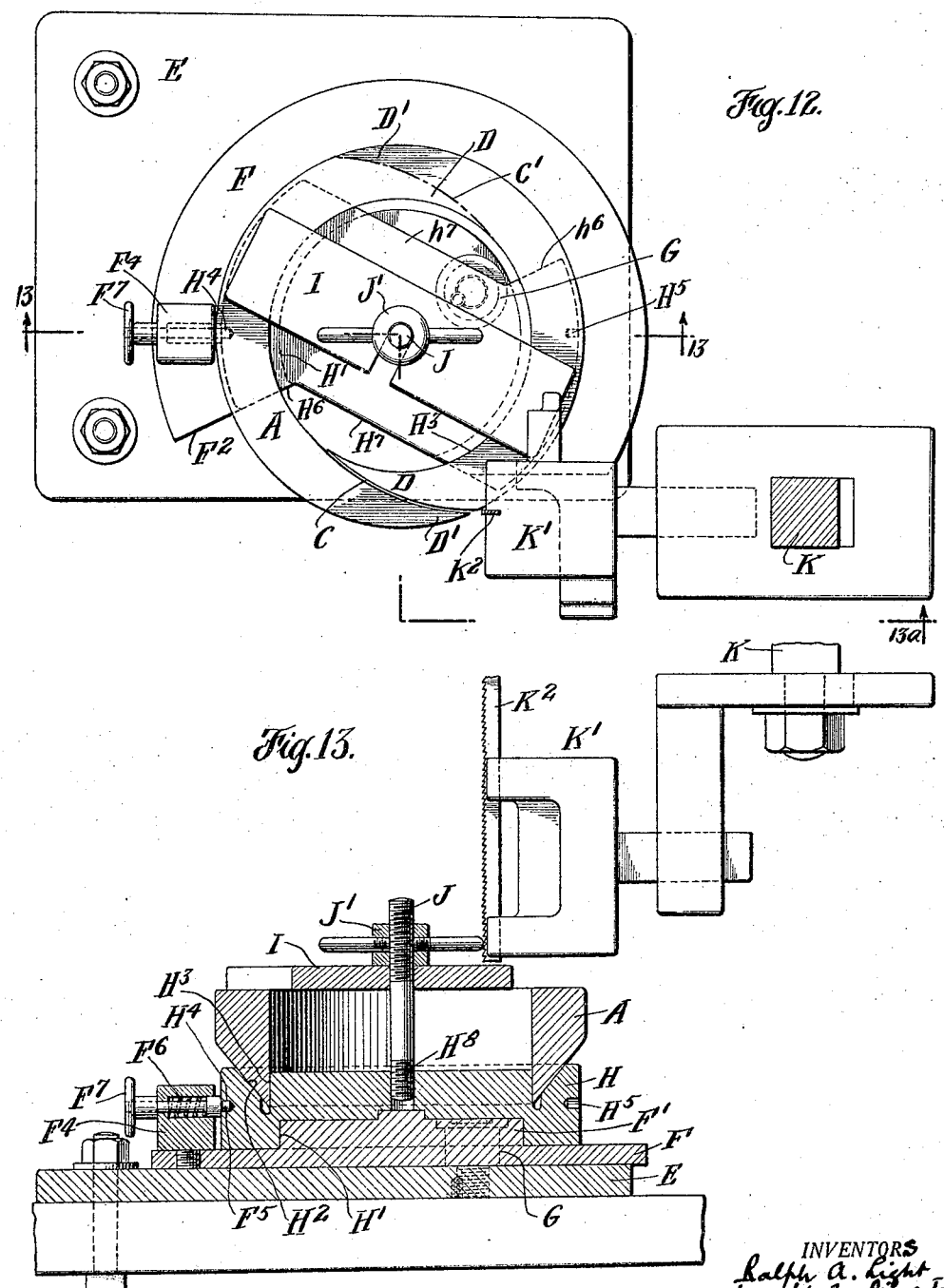

R. A. LIGHT AND J. W. PRICE, Jr.
MACHINE FOR SAWING INTEGRALLY CAST PACKING RINGS INTO SEGMENTS.
APPLICATION FILED NOV. 27, 1920.

1,413,668.

Patented Apr. 25, 1922.

UNITED STATES PATENT OFFICE.

RALPH A. LIGHT AND JOSEPH W. PRICE, JR., OF PHILADELPHIA, PENNSYLVANIA, ASSIGNORS TO THE UNITED STATES METALLIC PACKING COMPANY, OF PHILADELPHIA, PENNSYLVANIA, A CORPORATION OF PENNSYLVANIA.

MACHINE FOR SAWING INTEGRALLY-CAST PACKING RINGS INTO SEGMENTS.

1,413,668.          Specification of Letters Patent.     Patented Apr. 25, 1922.

Application filed November 27, 1920. Serial No. 426,754.

*To all whom it may concern:*

Be it known that we, RALPH A. LIGHT and JOSEPH W. PRICE, Jr., citizens of the United States of America, and residents of Philadelphia, in the county of Philadelphia and State of Pennsylvania, have invented certain new and useful Improvements in Machines for Sawing Integrally-Cast Packing Rings into Segments, of which the following is a true and exact description, reference being had to the accompanying drawings, which form a part thereof.

As heretofore manufactured, segmental metallic packing rings having tapered lapping ends have had their segments cast separately and afterwards machined to make them fit together. This mode of manufacture involves objectionable features notably because it is necessary, in order to insure that the molten metal will flow freely to all parts of the mold and also in order to give the tapered ends of the cast segments sufficient size and strength to prevent their breaking in withdrawing them from the mold, to make the mold, especially in that part which forms the tapered ends, considerably larger than the segment is intended to be when finished and this involves a quite considerable loss in the expensive metal of which the segments are formed. Again, the old method of manufacture is defective because the tapered ends of the segments when properly machined have fine and delicate edges which are very apt to become battered and broken in handling. To obviate these defects of the old method of manufacture we have devised a process of manufacturing such rings in which an integrally solid ring is first cast to approximately its desired shape, then sawed into segments with the tapered lapping ends and finally, by preference, compressed so as to bring the lapping ends into true contact with each other and give the ring its final manufactured form. This process of manufacture constitutes the subject matter of our copending application filed November 27, 1920, Serial No. 426,753.

Our present invention has for its object to provide a machine for sawing solid rings into segments with tapered lapping ends and our invention consists of a machine organized to perform this function, operating in the manner and having the features of construction which will be best understood as described in connection with the drawings and the novel features of which will be pointed out in the claims.

In the drawings:

Figure 1 is a plan view of an integrally cast packing ring, and

Figure 2 a cross section of the ring on the line 2—2 of Fig. 1, the parts to be preferably removed by machine being indicated in dotted lines.

Figure 3 is a plan view of the ring severed into two segments by saw cuts made through the ring on circular arcs.

Figure 4 is a similar view of the ring after compression to bring the lapping ends into true contact with each other and give the ring its final form.

Figure 5 is a plan view of the integrally cast ring divided into two segments by straight parallel saw cuts.

Figure 6 is a similar view showing the ring in Fig. 5 after compression.

Figure 7 is a side elevation of the ring divided into two segments by two saw cuts running obliquely through the ring from top to bottom and in opposite directions to each other.

Figure 8 is a plan view of this ring after the saw cuts are formed in it.

Figure 9 a plan view of the same ring after compression.

Figure 10 a side elevation of the same ring after compression.

Figure 11 a plan view of the ring divided by saw cuts into three segments.

Figure 12 is a plan view of our sawing mechanism adapted to sever the ring into segments as shown in Fig. 3.

Figure 13 is a sectional elevation of the sawing mechanism shown partly on the line 13—13 and partly on the line 13ª—13ª of Fig. 12.

Figure 14:
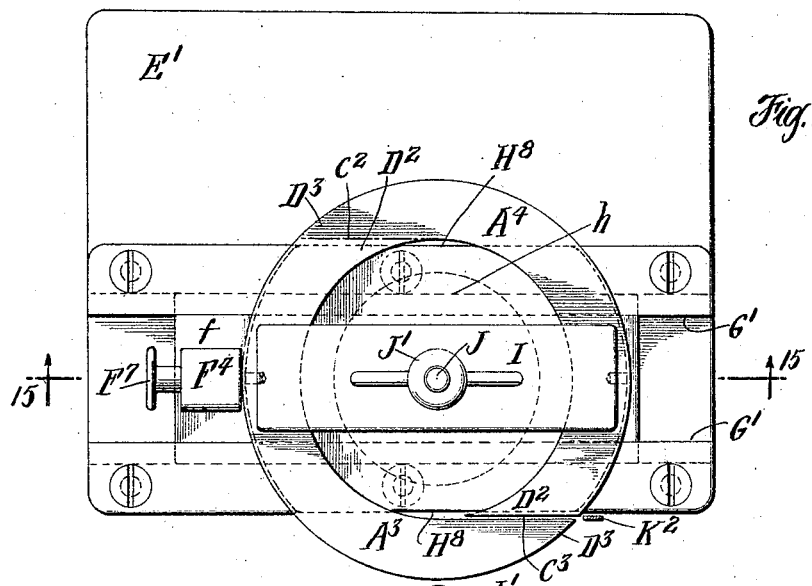

Figure 14 is a plan view of a modification of the sawing mechanism adapted for severing the ring into segments as shown in Fig. 5.

Figure 15:
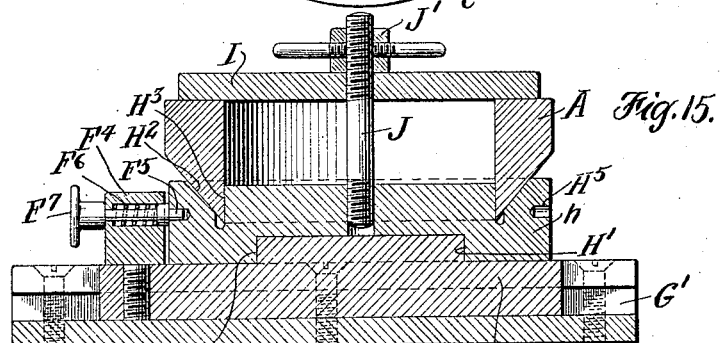

Figure 15 is a sectional elevation on the line 15—15 of Fig. 14, and

Figure 16:
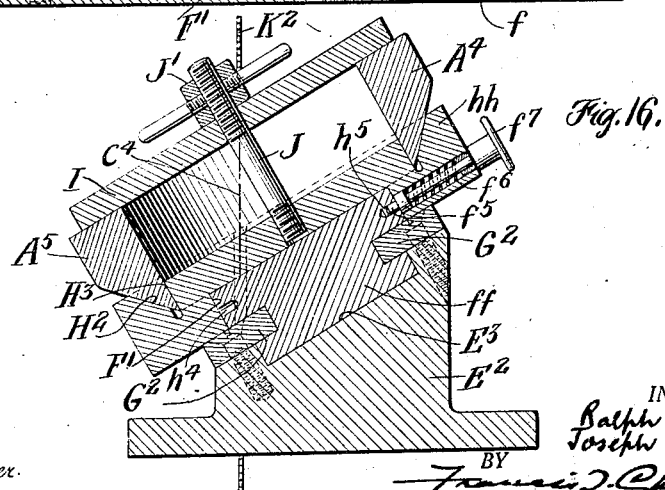

Figure 16 is a similar sectional elevation showing a modification of the sawing mechanism by which it is adapted to sever the ring as shown in Fig. 8.

A, Figs. 1 and 2, indicates the solid cast ring; B, B', B² and B³ indicating the portions of the outer face of the cast ring which it is desirable to remove by machining before sawing the ring into segments. A′ and A² indicate the two segments into which the ring is divided by the saw cuts indicated at C, C′, in Figs. 3 and 4; D, D′, indicating the lapping tapered ends of the segments. A³ and A⁴, Figs. 5 and 6 indicate the segments into which the ring is divided by the straight saw cuts indicated at C², C³; D², D³ indicating the lapping tapered ends of the rings. A⁵ and A⁶ indicate the two segments into which the ring is divided by the saw cuts indicated at C⁴ and C⁵, Figs. 7 to 10; D⁴ and D⁵ indicating the lapping tapered edges. A⁷, A⁸ and A⁹, Fig. 11, indicate three segments into which the ring is divided by saw cuts indicated at C⁶, C⁷ and C⁸; D⁶ and D⁷ indicating the lapping tapered edges in this construction. E, Figs. 12 and 13, is the base plate of the sawing mechanism and F is a chuck supporting plate having a cylindrical pivot extension indicated at F′, a plate F being pivotally attached to the base E by a pivot pin indicated at G. Plate F is cut away as indicated at F² so as to clear the saw blade while the ring is being sawed and, as shown, it has extending out from it the lock supporting block F⁴ in which is slidingly supported the locking bolt F⁵ pressed outwards by a spring F⁶ and having a grip F⁷ by which it can be drawn backward. H is a ring supporting chuck having a cylindrical bearing surface H′ which fits on the cylindrical pivot F′ and having its upper surface formed into a groove the sides H² and H³ of which fit against the tapered end of the packing ring A as shown. H⁴ and H⁵ are bolt holes formed on opposite sides of the chuck H and at H⁶, H⁷, h⁶, h⁷, we have indicated how this should be cut away in order that it may clear the saw blade during the sawing of the ring. I is a clamping plate by which the ring is clamped in the chuck by means of the threaded rod J and nut J′. K indicates the framing of the band saw supporting and actuating mechanism. K′ is a guide block for the saw and K² the band saw.

In the construction shown in Figs. 14 and 15, the supporting plate in the saw mechanism is indicated at E′ and has secured upon its face the straight guides indicated at G′ and G′. The chuck supporting plate indicated at f moves in this construction backward and forward between the guides G′, G′. As in the before described construction it is provided with cylindrical pivot extensions F′. h indicates the ring holding chuck pivotally supported on the support f and cut away at the sides as indicated at H⁸, H⁸, to clear the saw blade. In other respects it is similar to the chuck already described as are the appliances used in connection with it.

In the construction indicated in Fig. 16, the base is indicated at E² and has an inclined upper surface E³ on each side of which are provided guides G², G², for the chuck support indicated at ff. hh indicates the chuck pivotally supported on the chuck support as before but in this construction the bolt holes here indicated at h⁴, h⁵, are formed in the surface of the cylindrical pivot F′ while the bolt f⁵ with its spring f⁶ and head f⁷ is supported in the chuck hh, as shown.

In operation a solid ring as shown in Figs. 1 and 2 after being properly machined is clamped in the ring with the chuck as shown in Figs. 12 and 13 and the supporting chuck being located in position on the holder F first rotated on the pivot G as shown in Figs. 12 and 13 pressing the ring against the saw blade K² until the saw cut C is formed through it. The support is turned back on its pivot to clear the saw blade, the locking bolt H⁴ is drawn back and the chuck H is rotated through 180° and re-locked in this new position after which the support is again turned on its pivot G and the second saw cut formed through the ring severing it into symmetrical segments having lapping tapered ends which by preference are then brought into true contact with each other by pressure.

In the construction shown in Figs. 14 and 15 the mode of operating the mechanism is practically the same as above described except that the support f in this construction moves backward and forward on a straight line so that the saw blade K² will cut through the ring as indicated at C², C³.

Again, in the construction indicated in Fig. 16, the operation of the device is practically the same as in Fig. 15 except that the inclination of the chuck support relative to the saw blade K² results in severing the ring into segments on the lines C⁴ and C⁵.

Having now described our invention, what we claim as new and desire to secure by Letters Patent, is:

1. In a machine for sawing integrally cast metallic packing rings into segments having lapping ends, a saw, a chuck for holding the rings cut away to give passage to a saw blade at determined points, a pivotal support for said chuck concentric with the ring in position therein, on which it can be rotated through an arc of 180 or more degrees and means for supporting and guiding said pivotal support through a path which will cause the saw to sever the ring on predetermined lines.

2. In a machine for sawing integrally cast metallic packing rings into segments having lapping ends, a saw, a chuck for holding the rings cut away to give passage to a saw blade at determined points, a pivotal support for said chuck concentric with the ring in position therein, on which it can be rotated, through an arc of 180 or more degrees, means for supporting and guiding said pivotal support through a path which will cause the saw to sever the ring on predetermined lines and means for locking the pivotal support to the supporting and guiding means to hold it in fixed position thereon during the sawing of the ring.

3. In a machine for sawing integrally cast metallic packing rings into segments having lapping ends, a saw, a chuck for holding the rings cut away to give passage to a saw blade at determined points, a pivotal support for said chuck concentric with the ring in position therein, on which it can be rotated through an arc of 180 or more degrees and an eccentrically pivoted support and guide for the pivotal chuck support whereby it is guided through a circular path which will cause the saw to sever the ring on predetermined circular arcs.

4. In a machine for sawing integrally cast metallic packing rings into segments having lapping ends, a saw, a chuck for holding the rings cut away to give passage to a saw blade at determined points, a pivotal support for said chuck concentric with the ring in position therein, on which it can be rotated, through an arc of 180 or more degrees, an eccentrically pivoted support and guide for the pivotal chuck support whereby it is guided through a circular path which will cause the saw to sever the ring on predetermined circular arcs and means for locking the pivotal chuck support and its eccentrically pivoted guide together.

RALPH A. LIGHT.
JOSEPH W. PRICE, Jr.